US011375694B2

(12) United States Patent
Kim et al.

(10) Patent No.: US 11,375,694 B2
(45) Date of Patent: Jul. 5, 2022

(54) PET BATH

(71) Applicant: LG Electronics Inc., Seoul (KR)

(72) Inventors: Minchul Kim, Seoul (KR); Kyungrae Kim, Seoul (KR); Sangwoo Woo, Seoul (KR); Soungbong Choi, Seoul (KR)

(73) Assignee: LG Electronics Inc., Seoul (KR)

(*) Notice: Subject to any disclaimer, the term of this patent is extended or adjusted under 35 U.S.C. 154(b) by 262 days.

(21) Appl. No.: 16/586,459

(22) Filed: Sep. 27, 2019

(65) Prior Publication Data
US 2020/0100466 A1    Apr. 2, 2020

(30) Foreign Application Priority Data
Sep. 29, 2018    (KR) .................. 10-2018-0116664

(51) Int. Cl.
*A01K 13/00*    (2006.01)
(52) U.S. Cl.
CPC .................... *A01K 13/001* (2013.01)
(58) Field of Classification Search
CPC ........ A01K 13/001; A01K 15/04; A01K 1/00; A01K 1/03; A01K 1/01; A01K 27/007; A01K 45/002; A61D 7/00; A61D 11/00
USPC ................. 119/601, 668, 671, 673, 676, 665
See application file for complete search history.

(56) References Cited

U.S. PATENT DOCUMENTS

| | | | | |
|---|---|---|---|---|
| 3,884,191 A | * | 5/1975 | Stout .................... | A01K 13/001 119/671 |
| 3,985,102 A | * | 10/1976 | Yonezawa ............ | A01K 13/001 119/416 |
| 4,730,576 A | * | 3/1988 | Yoshikawa .......... | A01K 13/001 119/673 |
| 4,987,860 A | * | 1/1991 | Davis .................... | A01K 13/001 119/671 |
| 6,435,136 B1 | * | 8/2002 | Segura Munoz .... | A01K 13/001 119/650 |
| 6,443,164 B1 | * | 9/2002 | Parker .................... | B05B 14/46 132/333 |
| 7,497,188 B2 | * | 3/2009 | Cho ...................... | A01K 13/001 119/604 |
| 8,186,307 B2 | * | 5/2012 | Moharram ........... | A01K 13/001 119/651 |
| 2012/0055518 A1 | * | 3/2012 | Kim ..................... | A47L 15/4204 134/105 |
| 2012/0279456 A1 | * | 11/2012 | Caldwell .............. | A01K 13/001 119/668 |

(Continued)

*Primary Examiner* — Ebony E Evans
(74) *Attorney, Agent, or Firm* — Fish & Richardson P.C.

(57)    ABSTRACT

Disclosed herein is a pet bath. The pet bath includes an outer cabinet and an inner cabinet having open front surfaces, a door configured to open and close the open front surfaces of the outer and inner cabinets, a water collection tank to form a washing water storage space, a circulation pump to pump the washing water stored in the water collection tank, a lower nozzle and at least one upper nozzle to spray the washing water pumped by the circulation pump into a bathing enclosure, a stand disposed between the lower nozzle and the at least one upper nozzle, a circulation water filter to filter washing water, an air blower to circulate air in the bathing enclosure, and air nozzles to discharge air to an inside of the bathing enclosure, and inner exhaust holes to exhaust air are formed in an upper surface of the inner cabinet.

13 Claims, 17 Drawing Sheets

(56) References Cited

U.S. PATENT DOCUMENTS

2019/0357495 A1* 11/2019 Liu .......................... A01K 1/01

* cited by examiner

PET BATH

CROSS-REFERENCE TO RELATED APPLICATION

This application claims the priority benefit of Korean Patent Application No. 10-2018-0116664, filed on Sep. 29, 2018, the disclosure of which is incorporated herein by reference.

BACKGROUND OF THE INVENTION

1. Field of the Invention

The present disclosure relates to a pet bath, and more particularly, to an apparatus which may wash, rinse and dry a pet living in a residential space of humans.

2. Description of the Related Art

As concern and demand for pets are increased, interest in cleanliness of pets living in the same space as people is also increased.

Bathing of a pet living in a home is mainly performed in a bathroom through a shower and a separate dryer disposed in the bathroom. If bathing of the pet is carried out in the bathroom, when the pet recklessly moves or wags its trunk or tail to instinctively shake water off its body, a time taken to bathe the pet may be elongated, a surrounding environment may be contaminated, or an excessive amount of water may be used.

Therefore, apparatuses which may prepare a designated space for accommodating a pet to be bathed and supply washing water or air to the corresponding space to bathe the pet have been developed now.

Korean Patent Application No. 2003-0020892 A and Korean Utility Model Application No. 2013-0004113 U disclose apparatuses which may restrict movement of a pet during a bathing process.

However, in these cases, a problem of excessive use of water is still present.

Further, both washing and drying of the pet are carried out together, structural complexity may be caused, and water may be introduced into an electric device on a flow path for drying and thus cause failure of the electric device.

SUMMARY OF THE INVENTION

An object of the present disclosure is to provide a pet bath which may simultaneously perform washing, rinsing and drying of a pet.

Another object of the present disclosure is to provide a pet bath which may perform washing or rinsing of a pet using a small amount of water.

Another object of the present disclosure is to provide a pet bath which may safely bathe a pet.

Yet another object of the present disclosure is to provide a pet bath which may keep the inside thereof clean.

The objects of the present disclosure are not limited to the above-mentioned objects and other objects that have not been mentioned above will become evident to those skilled in the art from the following description.

To achieve the above objects, there is provided a pet bath according to an exemplary embodiment of the present disclosure, an outer cabinet configured to form an external appearance of the pet bath and having an open front surface, an inner cabinet provided within the outer cabinet to define a bathing enclosure and having an open front surface, a door configured to open and close the open front surfaces of the outer cabinet and the inner cabinet, a water collection tank disposed under the inner cabinet to form a space, in which washing water is stored, a circulation pump configured to pump the washing water stored in the water collection tank, a lower nozzle disposed in a lower portion of the bathing enclosure to spray the washing water pumped by the circulation pump to the bathing enclosure, at least one upper nozzle disposed above the lower nozzle to spray the washing water pumped by the circulation pump to the bathing enclosure, a stand disposed between the lower nozzle and the at least one upper nozzle to support a pet and configured to drain washing water therethrough, a circulation water filter configured to filter washing water flowing from the bathing enclosure to the water collection tank, an air blower disposed below the inner cabinet to circulate air in the bathing enclosure, and air nozzles disposed on side surfaces of the inner cabinet to discharge air flowing due to operation of the air blower to an inside of the bathing enclosure, wherein inner exhaust holes configured to exhaust air flowing in the bathing enclosure are formed in an upper surface of the inner cabinet, and thus, a pet may be washed and dried in one pet bath.

The lower nozzle may be disposed between a bottom surface of the inner cabinet and the stand and spray the washing water pumped by the circulation pump in an upward direction of the stand, thus being capable of washing the lower region of the pet body.

The at least one upper nozzle may be disposed in an upper portion of the bathing enclosure and spray the washing water pumped by the circulation pump in a downward direction, thus being capable of washing the upper region of the pet body.

The air nozzles may include a plurality of first air nozzles arranged in a vertical direction on one side surface of the inner cabinet and a plurality of second air nozzles arranged in the vertical direction on the other side surface of the inner cabinet, thus being capable of drying the pet.

The pet bath may further include a plurality of first inflow paths configured to respectively guide the air flowing due to operation of the air blower to the first air nozzles, a plurality of second inflow paths configured to respectively guide the air flowing due to operation of the air blower to the second air nozzles, a first air distributor configured to supply the air flowing due to operation of the air blower to at least one of the first inflow paths, and a second air distributor configured to supply the air flowing due to operation of the air blower to at least one of the second inflow paths, and thus, the air nozzles may spray air in various patterns.

An outer inflow hole configured to allow external air to flow into the bathing enclosure and an outer exhaust hole configured to exhaust air flowing through the inner exhaust holes to the outside may be formed in the outer cabinet or in a space between the inner cabinet and the outer cabinet, and thus, dry air at the outside may be supplied to the bathing enclosure and humid air in the bathing enclosure may be discharged to the outside.

Inflow paths configured to guide air flowing due to operation of the air blower to the air nozzles, an exhaust flow path along which air exhausted from the bathing enclosure via the inner exhaust holes flows, and a circulation flow path along which air flowing along the exhaust flow path flows to a space, in which the air blower is disposed, may be disposed between the inner cabinet and the outer cabinet, and thus, the pet may be dried through circulation air within the outer cabinet.

The air heater may be a heat pump including a compressor configured to compress a refrigerant, a condenser configured to condense the compressed refrigerant, an expander configured to expand the condensed refrigerant, and an evaporator configured to evaporate the expanded refrigerant, air flowing into the circulation flow path may sequentially pass through the evaporator and the condenser and be supplied to the circulation flow path, and thus, circulated air may be dried and supplied to the bath.

The pet bath may further include a bubble generator disposed between the stand and a bottom surface of the inner cabinet to generate bubbles in flowing washing water, thus being capable of supplying bubbles to circulated washing water.

The circulation water filter may have a cylindrical shape having a hollow formed therethrough in a vertical direction, and a filter net may be disposed on a circumferential surface of the circulation water filter, thus being capable of filtering out foreign substances from the circulated washing water.

A filter mounting part formed to have a shape surrounding an outer surface of the circulation water filter may be formed within the water collection tank so that the circulation water filter is mounted in the filter mounting part, and a plurality of through holes configured to allow washing water flowing in the circulation water filter to flow into the water collection tank may be formed through the filter mounting part, thus being capable of filtering out foreign substances from the circulated washing water.

The at least one upper nozzle may include a plurality of first upper nozzles arranged in a vertical direction on one side surface of the inner cabinet and a plurality of second upper nozzles arranged in the vertical direction on the other side surface of the inner cabinet, and a plurality of nozzle valves configured to respectively adjust supply of washing water to the first upper nozzles and the second upper nozzles may be disposed at the first upper nozzles and the second upper nozzles, thereby being capable of effectively washing the pet.

The pet bath may further include a controller configured to respectively control the nozzle valves, the controller may control opening and closing of each of the nozzle valves when washing the pet, or rinsing the pet to remove a remaining detergent or bubbles from a body of the pet, and thus, the upper nozzle valves may spray washing water in various patterns.

To achieve the above objects, there is provided a method for controlling a pet bath according to an exemplary embodiment of the present disclosure, including washing a pet located in a bathing enclosure using a detergent, rinsing the pet so as to remove a remainder of the detergent or bubbles from a body of the pet, after the washing the pet, drying the pet so as to remove moisture from the body of the pet, after the rinsing the pet, and washing the bathing enclosure, after the drying the pet, wherein the washing the bathing enclosure is performed in a state in which an inside of the bathing enclosure is checked, and thereby, a pet may be bathed and the pet bath may be washed.

The washing the bathing enclosure may include checking the inside of the bathing enclosure, connecting a water stream distributor, configured to supply washing water pumped by a circulation pump to at least one upper nozzle or a lower nozzle, to the at least one upper nozzle, operating the circulation pump, and operating a drain pump, and thereby, the bathing enclosure may be washed under the condition that no pet is present in the bathing enclosure.

In the checking the inside of the bathing enclosure, the inside of the bathing enclosure may be checked using a height sensor disposed in the bathing enclosure.

The washing the pet may include supplying washing water to a water collection tank by opening a water supply valve, supplying washing water stored in the water collection tank into the bathing enclosure by operating a circulation pump, generating bubbles in flowing washing water by operating a bubble generator, connecting a water stream distributor, configured to supply washing water pumped by the circulation pump to at least one upper nozzle or a lower nozzle, to the at least one upper nozzle or the lower nozzle, and draining the washing water stored in the water collection tank by operating a drain pump, and thereby, the pet may be washed using circulated water.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE EMBODIMENTS

The advantages and features of the present disclosure and the way of attaining the same will become apparent with reference to embodiments described below in conjunction with the accompanying drawings. Reference will now be made in detail to the preferred embodiments of the present disclosure, examples of which are illustrated in the accompanying drawings. Wherever possible, the same reference numbers will be used throughout the drawings to refer to the same or like parts.

In the following description of the embodiments, it will be understood that expressions indicating directions, such as front (F)/rear (R)/left (Le)/right (Ri)/up (U)/down (D), are defined as being illustrated in the respective drawings, but these expressions are merely to provide a better understanding of the present disclosure and may be defined differently based on criteria.

Hereinafter, pet bathes in accordance with the embodiments of the present disclosure will be described with reference to the accompanying drawings.

<Overall Configuration>

Figure 1:
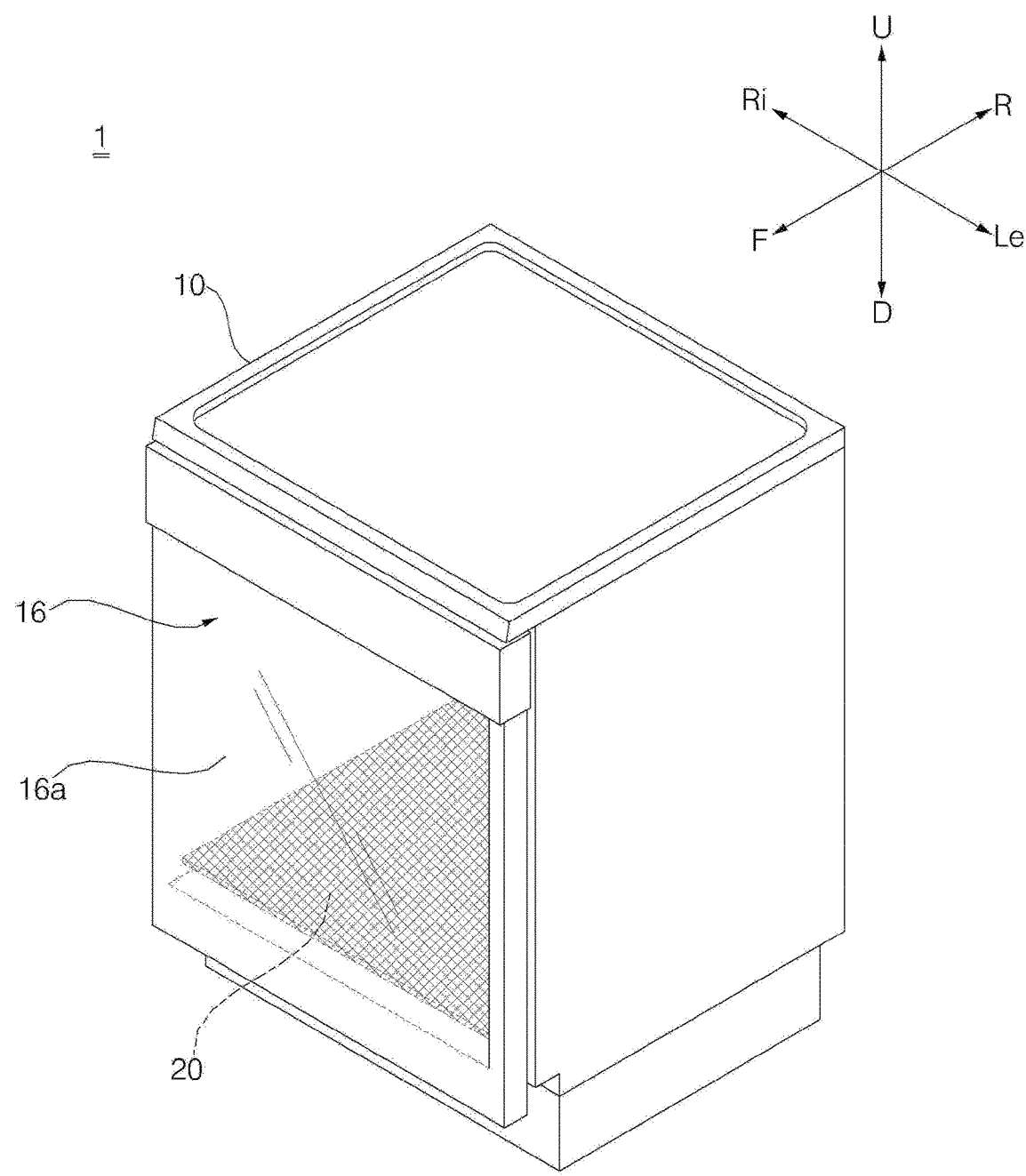
FIG. 1 is a perspective view of a pet bath in accordance with one embodiment of the present disclosure.
Figure 2:
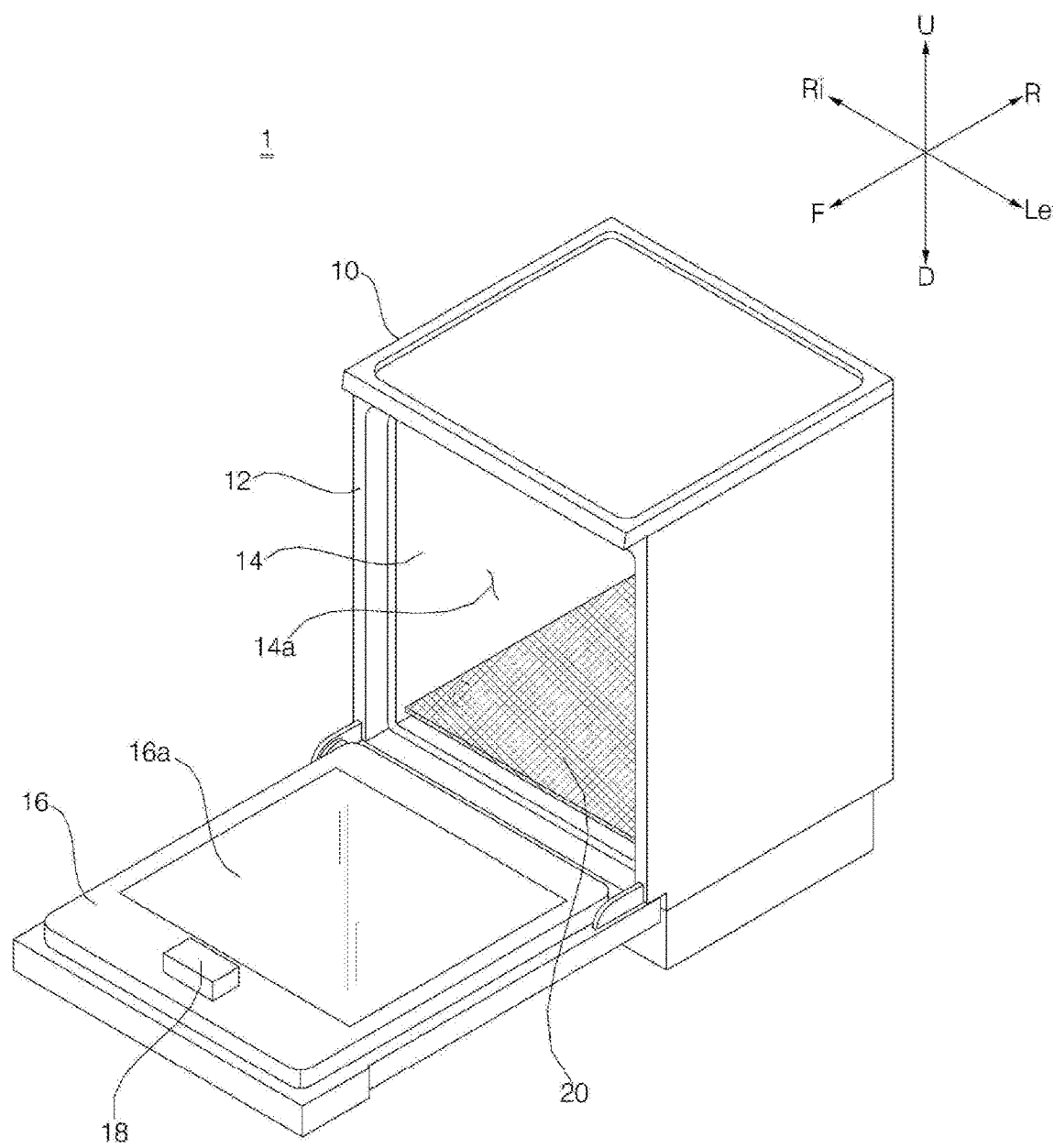
FIG. 2 is a perspective view illustrating the pet bath in accordance with one embodiment of the present disclosure in a state in which a door is open.
Figure 3:
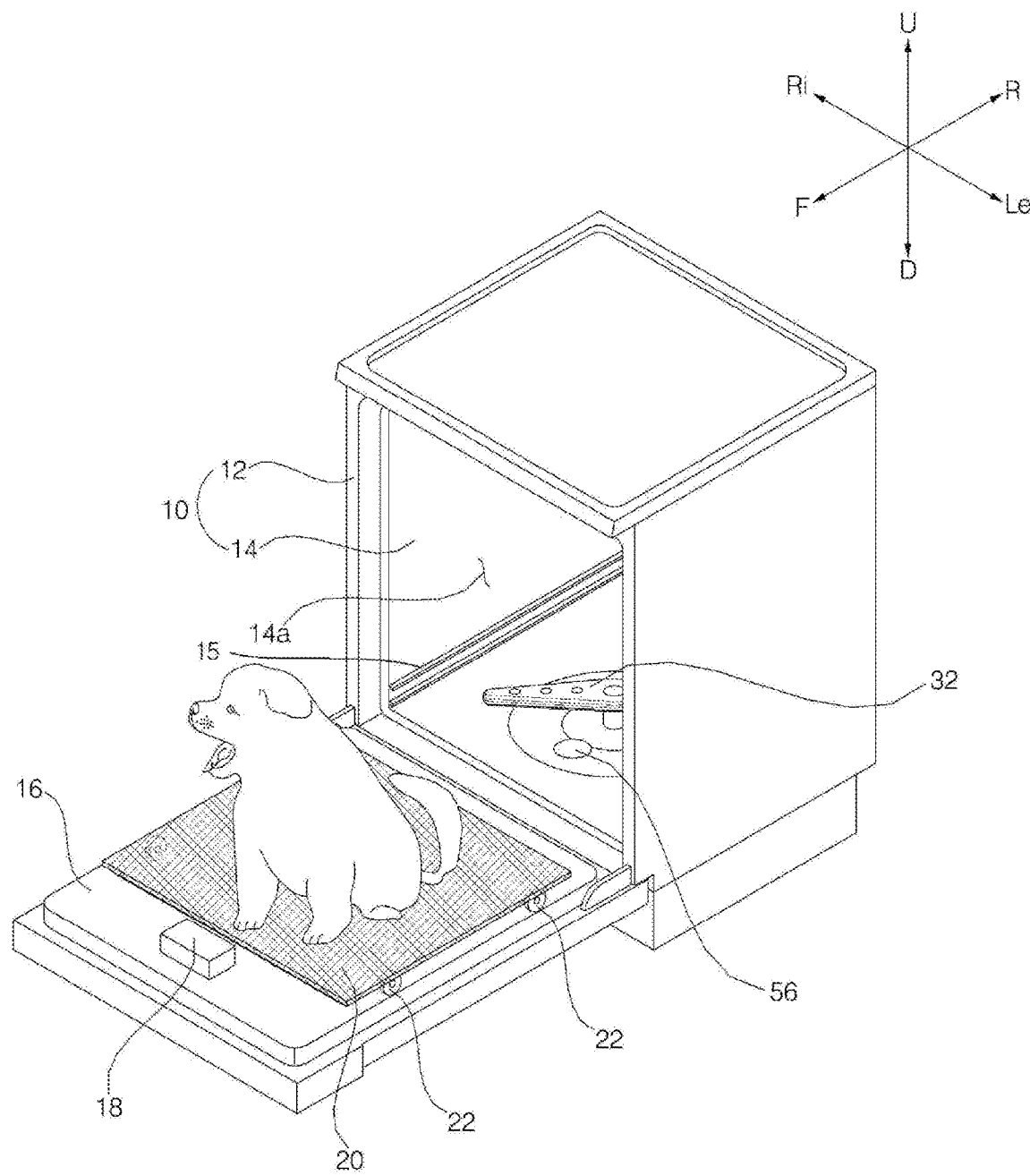
FIG. 3 is a perspective view illustrating the pet bath in accordance with one embodiment of the present disclosure in a state in which the door is open and a stand is withdrawn.
Figure 4:
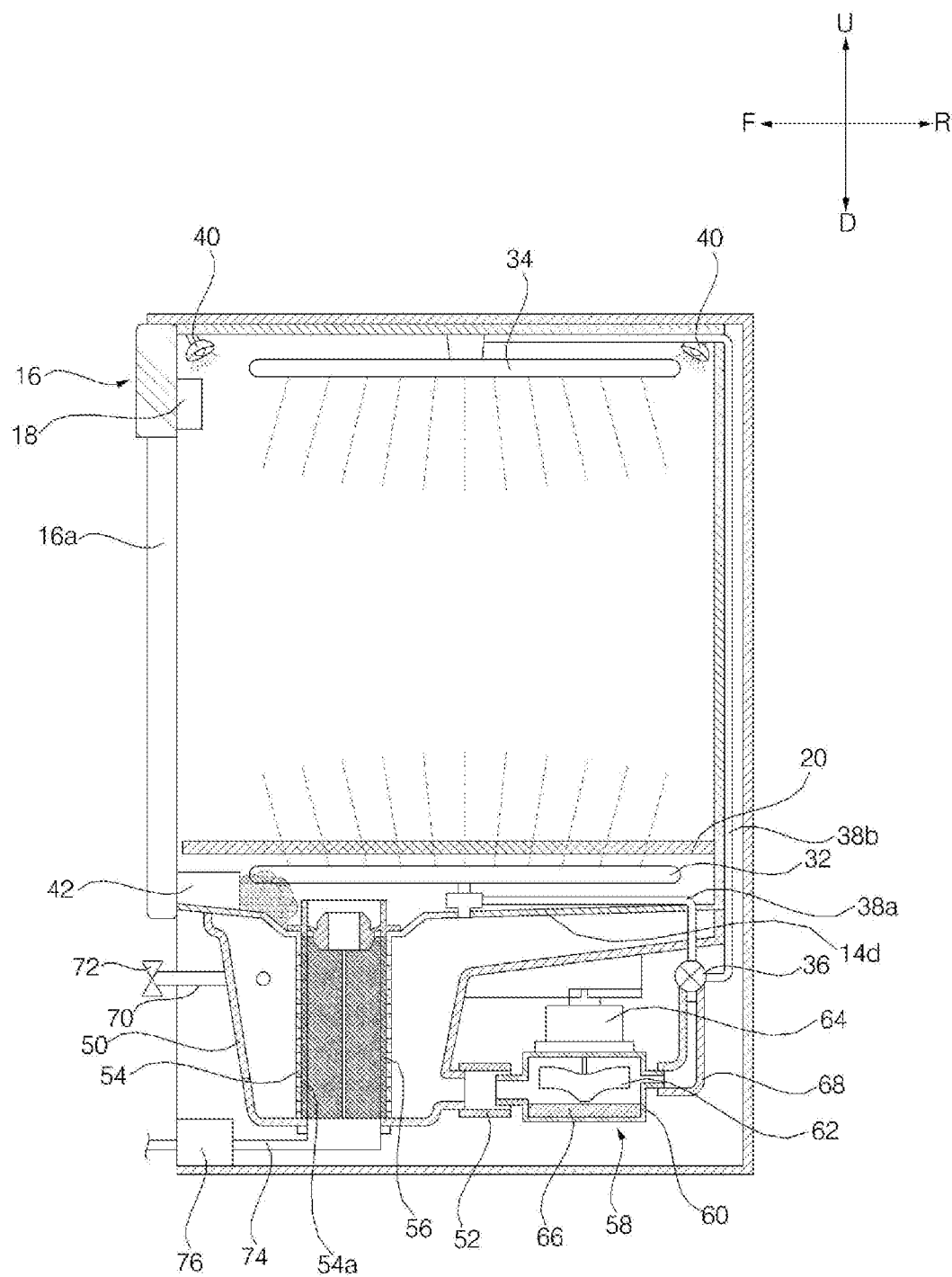
FIG. 4 is a schematic side sectional view of the pet bath in accordance with one embodiment of the present disclosure.

FIG. 1 is a perspective view of a pet bath in accordance with one embodiment of the present disclosure. FIG. 2 is a perspective view illustrating the pet bath in accordance with one embodiment of the present disclosure in a state in which a door is open. FIG. 3 is a perspective view illustrating the pet bath in accordance with one embodiment of the present disclosure in a state in which the door is open and a stand is withdrawn. FIG. 4 is a schematic side sectional view of the pet bath in accordance with one embodiment of the present disclosure.

Hereinafter, referring to FIGS. 1 to 4, the overall configuration of the pet bath in accordance with this embodiment will be described.

A pet bath 1 in accordance with this embodiment includes a casing 10 which forms an external appearance of the pet bath 1 and an open front surface, a door 16 which opens and closes the open front surface of the casing 10, a stand 20 which is configured to support a pet and to drain washing water, a washing device which supplies washing water to a bathing enclosure 14a to wash and rinse the pet, and a drying device which supplies air to the bathing enclosure 14a to dry the pet.

The casing 10 may include an inner cabinet 14 which defines the bathing enclosure 14a, and an outer cabinet 12 which surrounds the inner cabinet 14 and forms the external appearance of the pet bath 1. The inner surface of the outer cabinet 12 is spaced apart from the outer surface of the inner cabinet 14, and thus a circulation water connection pipe 38b to supply water to an upper nozzle 34 may be disposed between the inner surface of the outer cabinet 12 and the outer surface of the inner cabinet 14.

The outer cabinet 12 in accordance with this embodiment has a hexahedral box shape having an open front surface. A space in which the inner cabinet 14 is disposed and a space in which the washing device and the drying device are disposed may be formed within the outer cabinet 12. Here, some elements of the washing device and the drying device may be disposed under the bathing enclosure 14a.

The inner cabinet 14 in accordance with this embodiment is disposed within the outer cabinet 12, and thus forms the bathing enclosure 14a in which the pet is washed, rinsed or dried. The front surface of the inner cabinet 14 is open so that the pet enters and exits the bathing enclosure 14a therethrough.

A bottom surface 14d of the inner cabinet 14 may be inclined toward a water collection tank 50 so that washing water flows to the water collection tank 50.

A lower nozzle 32, the upper nozzle 34 and the stand 20, which will be described below, may be disposed within the inner cabinet 14 in accordance with this embodiment. Further, lighting devices 40 and a bubble generator 42, which will be described below, may be disposed in the inner cabinet 14.

The door 16 in accordance with this embodiment opens and closes the open front surfaces of the casing 10 and the inner cabinet 14. The lower end of the door 16 may be rotatably fixed to the casing 10, and thus, the door 16 may be rotated using the lower end thereof as a rotary axis to open or close the front surface of the casing 10. When the door 16 is opened, the door 16 may support the withdrawn stand 20.

A part of the door 16 in accordance with this embodiment may include a transparent panel 16a. Therefore, when the pet in the inner cabinet 14 is washed, rinsed and dried, a user may check the state of the pet in the bathing enclosure 14a through the transparent panel 16a or the pet may see the outside through the transparent panel 16a, and thus, bathing of the pet may be stably performed.

A dispenser 18 which temporarily accommodates a pet care agent, such as shampoo, and discharges the pet care agent to the bathing enclosure 14a may be disposed on the inner surface of the door 16. The dispenser 18 in accordance with this embodiment may be disposed above the transparent panel 16a formed of a transparent material. The dispenser 18 may accommodate the pet care agent, and be opened in a washing operation so as to discharge the pet care agent to a space of the bathing enclosure 14a.

The stand 20 in accordance with this embodiment is disposed at the lower portion of the inner cabinet 14. The stand 20 is detachably disposed on the inner cabinet 14. The stand 20 may be withdrawn in the forward direction of the inner cabinet 14 by rollers 22 installed at the lower portion of the stand 20. Guide parts 15 which guide the rollers 22 installed on the stand 20 may be formed on both side surfaces of the inner cabinet 14. The guide parts 15 in accordance with this embodiment may protrude from the side surfaces of the inner cabinet 14 toward the bathing enclosure 14a so as to form surfaces being opposite to the lower ends of the rollers 22 and the upper surface of the stand 20.

The stand 20 may be withdrawn in the forward direction of the casing 10, when the door 16 is completely opened. The stand 20 may be withdrawn to the upper part of the opened door 16.

<Washing Device>

Figure 5:
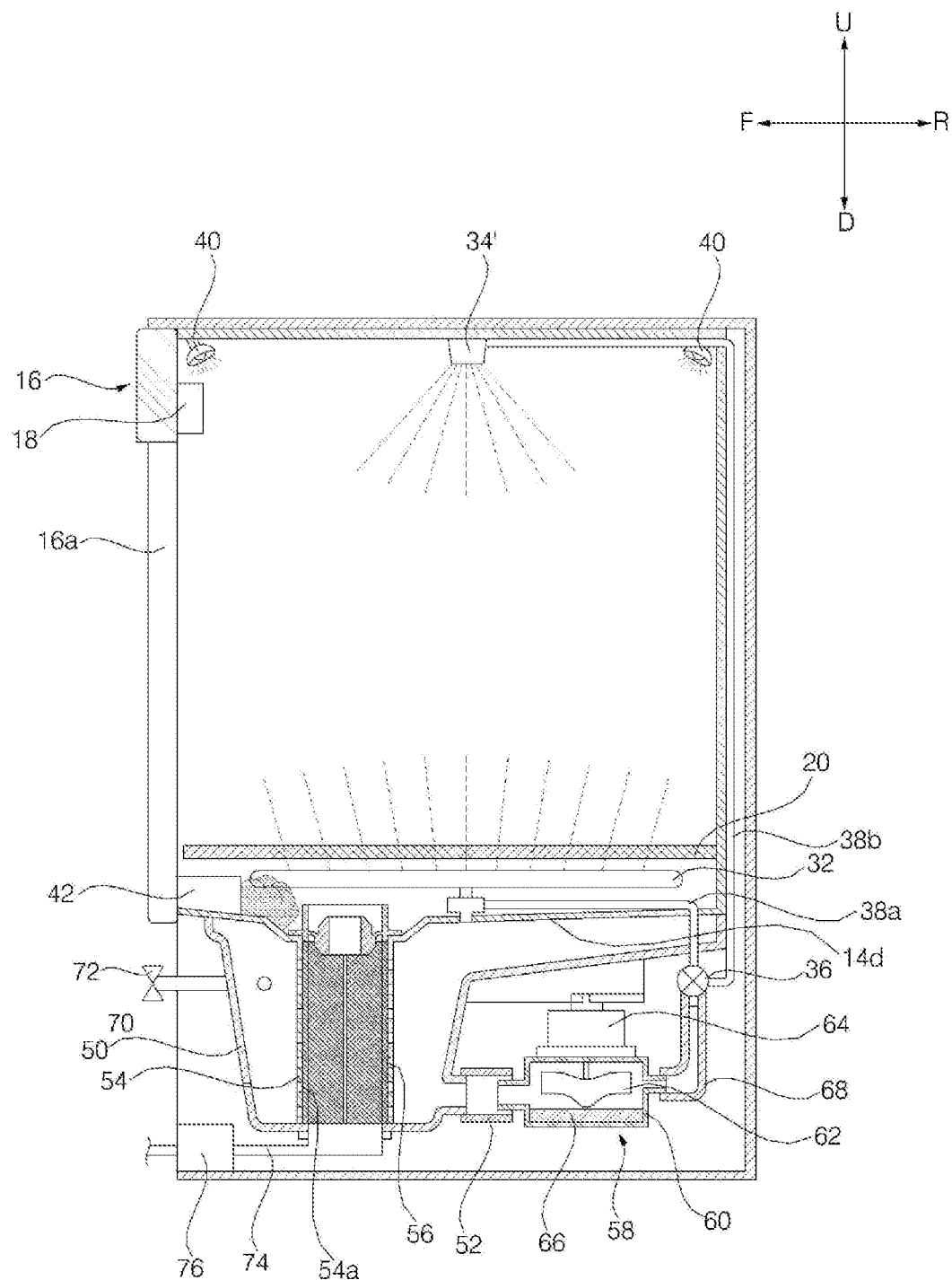
FIG. 5 is a schematic side sectional view of a pet bath in accordance with another embodiment of the present disclosure.
Figure 6:
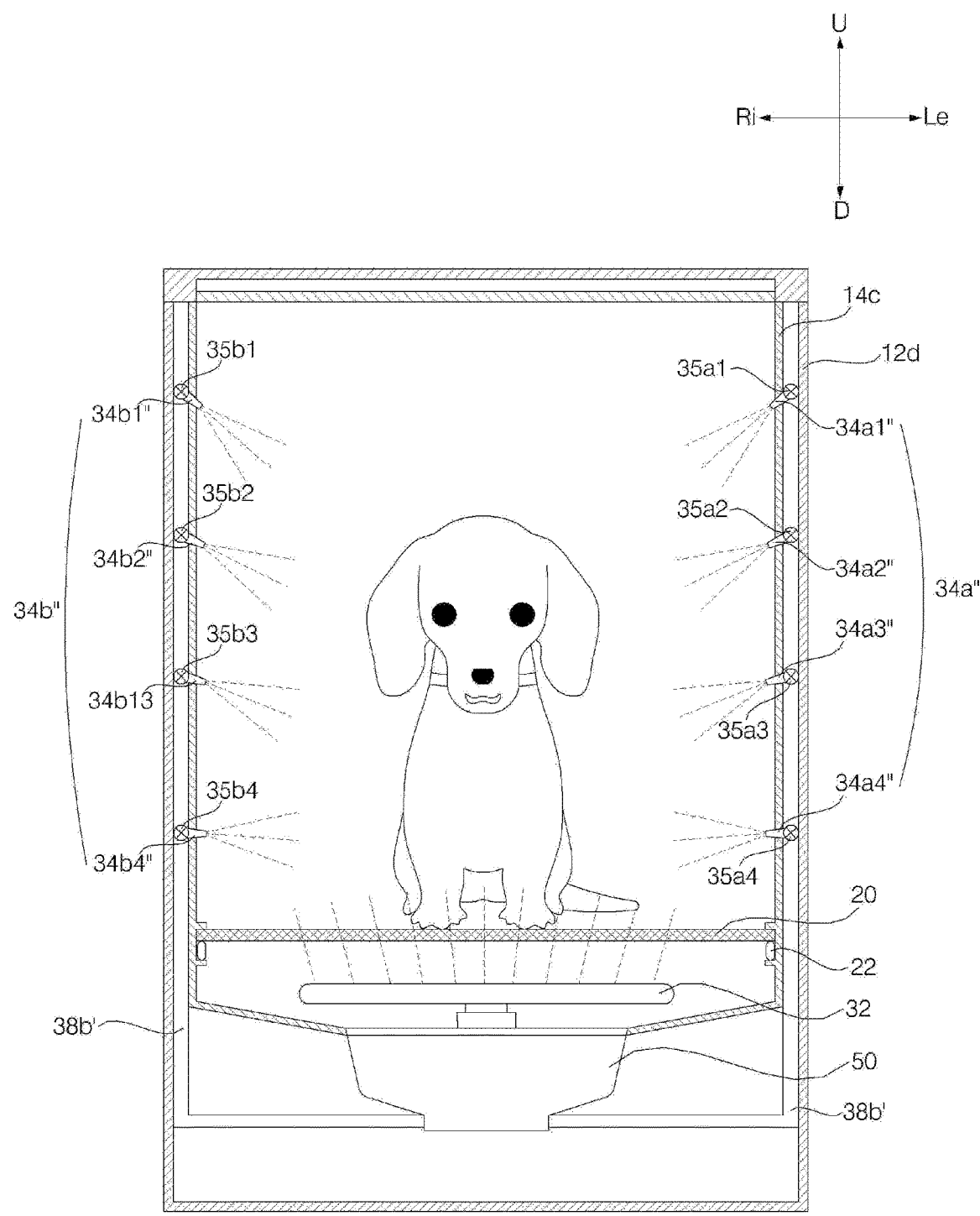
FIG. 6 is a schematic front sectional view of a pet bath in accordance with yet another embodiment of the present disclosure.
Figure 7A:
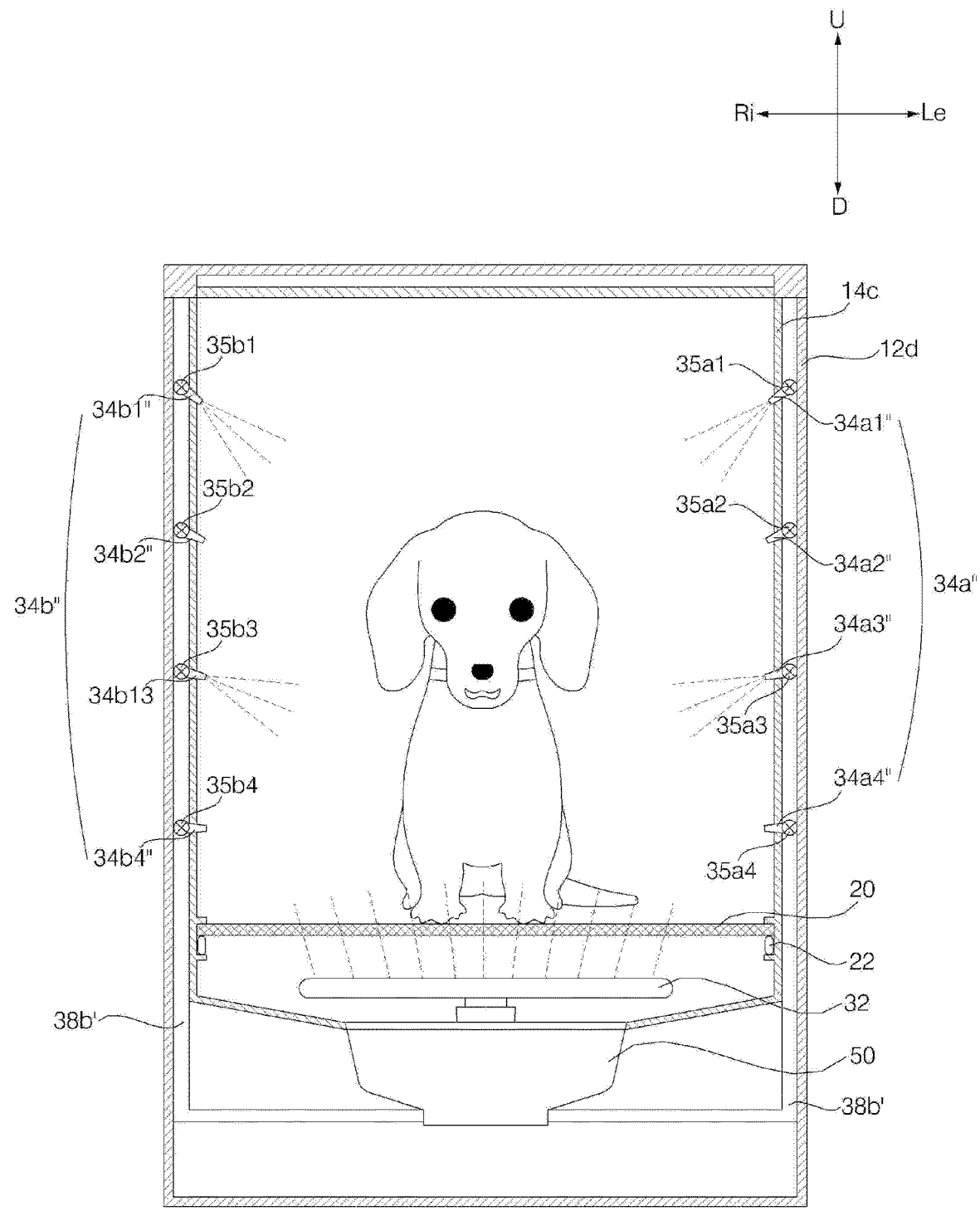
FIGS. 7A and 7B are views illustrating exemplary spray patterns of upper nozzles of FIG. 6.
Figure 7B:
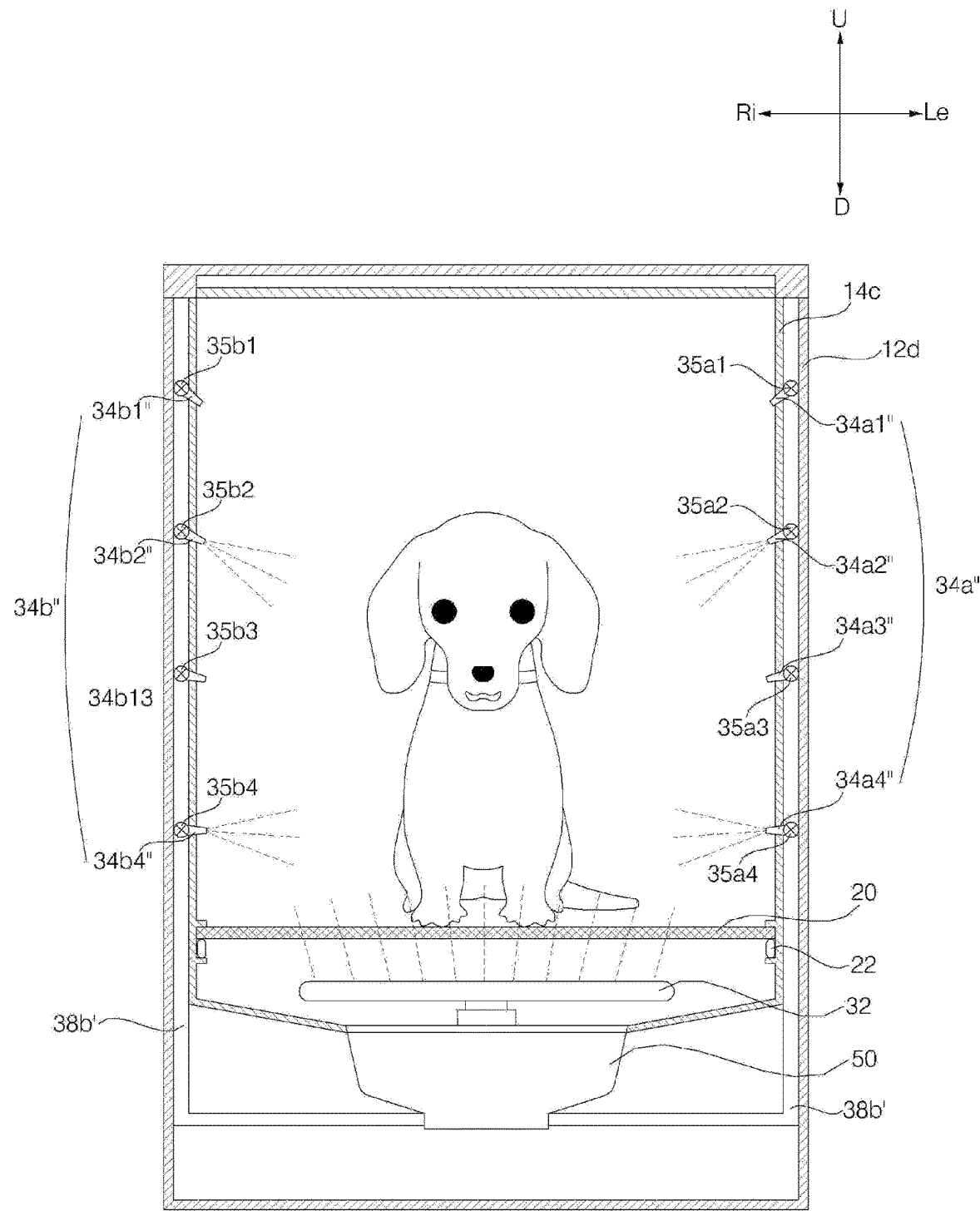

FIG. 4 is a schematic side sectional view of the pet bath in accordance with one embodiment of the present disclosure. FIG. 5 is a schematic side sectional view of a pet bath in accordance with another embodiment of the present disclosure. FIG. 6 is a schematic front sectional view of a pet bath in accordance with yet another embodiment of the present disclosure. FIGS. 7A and 7B are views illustrating exemplary spray patterns of upper nozzles of FIG. 6.

Hereinafter, elements related to the washing device of the pet bath in accordance with this embodiment will be described with reference to FIGS. 4 to 7B.

The washing device in accordance with this embodiment includes the water collection tank 50 which stores washing water supplied to the bathing enclosure 14a, a circulation pump 58 which pumps washing water stored in the water collection tank 50, spray nozzles which supply washing water pumped by the circulation pump 58 to the bathing enclosure 14*a*, and a circulation water filter 56 which filters washing water flowing from the bathing enclosure 14*a* into the water collection tank 50.

The water collection tank 50 in accordance with the present disclosure may be disposed under the inner cabinet 14. Therefore, washing water supplied to the bathing enclosure 14*a* may flow into the water collection tank 50. The water collection tank 50 may be formed to have a bowl shape, and temporarily store a designated amount of washing water flowing from an external water source or the bathing enclosure 14*a*.

A filter mounting part 54 in which the circulation water filter 56 is mounted may be disposed in the water collection tank 50. The filter mounting part 54 may have a shape surrounding the outer surface of the circulation water filter 56. Therefore, the circulation water filter 56 may be mounted in the filter mounting part 54. A plurality of through holes 54*a* may be formed through the filter mounting part 54 so that washing water flowing in the circulation water filter 56 flows into the water collection tank 50 through the through holes 54*a*.

The circulation pump 58 in accordance with this embodiment may be connected to the water collection tank 50, and pump water stored in the water collection tank 50 to the bathing enclosure 14*a*. The circulation pump 58 in accordance with this embodiment includes a circulation pump housing 60 which is disposed at one side of the water collection tank 50 and forms the external appearance of the circulation pump 58, an impeller 62 which is disposed within the circulation pump housing 60 and is rotated to pump washing water, and a circulation motor 64 which rotates the impeller 62. The circulation pump 58 and the water collection tank 50 may be connected by a water collection tank connection pipe 52.

The circulation pump 58 in accordance with this embodiment may further include a circulation water heater 66 which heats washing water flowing into the circulation pump housing 60. The circulation water heater 66 may heat water flowing into the circulation pump housing 60. Washing water heated by the circulation water heater 66 may be supplied to the bathing enclosure 14*a* due to operation of the circulation motor 64.

The spray nozzles in accordance with this embodiment include the lower nozzle 32 which is disposed in the lower portion of the bathing enclosure 14*a* and sprays washing water upwards, and the upper nozzle 34 which is disposed above the lower nozzle 32 and sprays washing water to the space of the bathing enclosure 14*a*. The washing device in accordance with this embodiment includes a water stream distributor 36 which distributes washing water pumped by the circulation pump 58 to the upper nozzle 34 or the lower nozzle 32. Washing water pumped by the circulation pump 58 may be supplied to the upper nozzle 34 and/or the lower nozzle 32 due to operation of the water stream distributor 36.

The lower nozzle 32 may be disposed under the stand 20. The stand 20 may have a structure having a plurality of communication holes so as to minimize disturbance of a flow of washing water sprayed by the lower nozzle 32.

The lower nozzle 32 is disposed in the lower portion of the bathing enclosure 14*a*, and sprays washing water upwards. The lower nozzle 32 may include a plurality of spray arms extending in two directions or four directions radially from the center of the lower nozzle 32. The lower nozzle 32 may have a structure in which, when washing water is supplied to the lower nozzle 32, the lower nozzle 32 is rotated by pressure of the washing water supplied to the lower nozzle 32.

The upper nozzle 34 is disposed above the lower nozzle 32, and sprays washing water to the bathing enclosure 14*a*. The upper nozzle 34 is disposed above the stand 20. The upper nozzle 34 may have various shapes or be disposed at various positions within a range that does not restrict movement of the pet and does not harm the pet.

Referring to FIG. 4, the upper nozzle 34 in accordance with this embodiment is disposed in the upper portion of the bathing enclosure 14*a*. The upper nozzle 34 in accordance with this embodiment includes a plurality of spray parts extending in two directions or four directions from the center of the upper nozzle 34. Therefore, the upper nozzle 34 may be rotated about the center thereof, and spray washing water downwards.

Referring to FIG. 5, an upper nozzle 34' in accordance with another embodiment may be disposed in the upper portion of the bathing enclosure 14*a*, and have a shower nozzle structure. The upper nozzle 34' in accordance with this embodiment may spray washing water to a wide area downwards from the center of the upper portion of the bathing enclosure 14*a* without separate rotation.

Referring to FIG. 6, upper nozzles 34*a*" and 34*b*" in accordance with yet another embodiment are disposed in plural on the side surfaces of the bathing enclosure 14*a*. The upper nozzles 34*a*" and 34*b*" in accordance with this embodiment may include first upper nozzles 34*a*" disposed on the left side surface of the inner cabinet 14, and second upper nozzles 34*b*" disposed on the right side surface of the inner cabinet 14. The first upper nozzles 34*a*" and the second upper nozzles 34*b*" may be disposed such that downward inclinations thereof are gradually increased as they are closer to the upper end of the bathing enclosure 14*a*.

A plurality of nozzle valves 35*a*1, 35*a*2, 35*a*3 and 35*a*4 may be disposed at the first upper nozzles 34*a*1", 34*a*2", 34*a*3" and 34*a*4" in accordance with this embodiment such that each of the nozzle valves 35*a*1, 35*a*2, 35*a*3 and 35*a*4 is disposed at each of the first upper nozzles 34*a*1", 34*a*2", 34*a*3" and 34*a*4" so as to adjust supply of washing water to the corresponding first upper nozzle. A plurality of nozzle valves 35*b*1, 35*b*2, 35*b*3 and 35*b*4 may be disposed at the second upper nozzles 34*b*1", 34*b*2", 34*b*3" and 34*b*4" in accordance with this embodiment such that each of the nozzle valves 35*b*1, 35*b*2, 35*b*3 and 35*b*4 is disposed at each of the second upper nozzles 34*b*1", 34*b*2", 34*b*3" and 34*b*4" so as to adjust supply of washing water to the corresponding second upper nozzle.

The pet bath in accordance with this embodiment may respectively control the nozzle valves 35*a*1, 35*a*2, 35*a*3, 35*a*4, 35*b*1, 35*b*2, 35*b*3 and 35*b*4, thus being capable of adjusting supply of washing water to the first upper nozzles 34*a*1", 34*a*2", 34*a*3" and 34*a*4" and the second upper nozzles 34*b*1", 34*b*2", 34*b*3" and 34*b*4". That is, as shown in FIG. 7A, washing water may be supplied to (2n−1)th first upper nozzles and second upper nozzles 34*a*1", 34*a*3", 34*b*1" and 34*b*3" (n=1, 2) from the top. Alternatively, as shown in FIG. 7A, washing water may be supplied to (2n)th first upper nozzles and second upper nozzles 34*a*2", 34*a*4", 34*b*2" and 34*b*4" (n=1, 2) from the top.

Otherwise, washing water may be supplied to the upper nozzles 35*a*1, 35*a*2, 35*a*3, 35*a*4, 35*b*1, 35*b*2, 35*b*3 and 35*b*4 through various patterns, such as by respectively controlling the nozzle valves 35*a*1, 35*a*2, 35*a*3, 35*a*4, 35*b*1, 35*b*2, 35*b*3 and 35*b*4 based on the size of the pet sensed by a height sensor 106. Washing water may be sprayed to the inside of the bathing enclosure 14*a* by selectively controlling opening and closing of the nozzle valves 35*a*1, 35*a*2, 35*a*3, 35*a*4, 35*b*1, 35*b*2, 35*b*3 and 35*b*4.

The circulation water filter 56 in accordance with this embodiment filters washing water flowing from the bathing enclosure 14*a* to the water collection tank 50. That is, the circulation water filter 56 may filter out pet fur from washing water, when the pet is washed or rinsed.

The circulation water filter 56 in accordance with this embodiment may be formed to have a cylindrical shape having a hollow formed therethrough in the vertical direction. A filter net which filters out pet fur or dirt may be disposed on the circumferential surface of the circulation water filter 56. Therefore, dirt which is heavy in weight may be moved to the open lower part of the circulation water filter 56 and then discharged by the drain pump 76. Further, fur which is light in weight may be filtered out by the filter net provided on the circumferential surface of the circulation water filter 56. That is, when water stored in the water collection tank 50 is circulated by the circulation pump 58, foreign substances having a heavy weight may be moved to the lower part of the circulation water filter 56, and foreign substances having a light weight may be filtered out by the filter net.

The washing water, from which pet fur or dirt is removed by the circulation water filter 56, may flow into the water collection tank 50, and thereby, a designated amount of washing water may be circulated to wash the pet.

The washing device in accordance with this embodiment may further the bubble generator 42 which generates bubbles in washing water flowing within the bathing enclosure 14*a*. The bubble generator 42 may include a container which is filled with soap for bubbles, a flow path through which water is supplied to the container, and an agitator which agitates a mixture of the soap and water filling the container.

Further, the bubble generator 42 generates bubbles in washing water, to which a detergent is supplied by the dispenser 18. The bubble generator 42 is disposed on the bottom surface of the inner cabinet 14 and generates bubbles in washing water which flows. The bubbles generated by the bubble generator 42 may be introduced into the water collection tank 50, pumped by the circulation pump 58 and then again sprayed to the inside of the bathing enclosure 14*a* through the spray nozzles.

The washing device in accordance with this embodiment may further include the water collection tank connection pipe 52 which connects the water collection tank 50 to the circulation pump 58, and circulation water connection pipes 38*a* and 38*b* which connect the water stream distributor 36 to the lower nozzle 32 and the upper nozzle 34, respectively.

The pet bath 1 in accordance with this embodiment may include a water supply assembly which supplies water from the external water source to the water collection tank 50, and a drain assembly which drains water stored in the water collection tank 50 to the outside.

The water supply assembly includes a water supply pipe 70 which connects the external water source to the water collection tank 50, and a water supply valve 72 which opens and close the water supply pipe 70, and the drain assembly includes a drain pipe 74 which drains water stored in the water collection tank 50 to the outside, and a drain pump 76 which pumps water stored in the water collection tank 50 to the outside through the drain pipe 74.

<Drying Device—Embodiment 1>

Figure 8A:
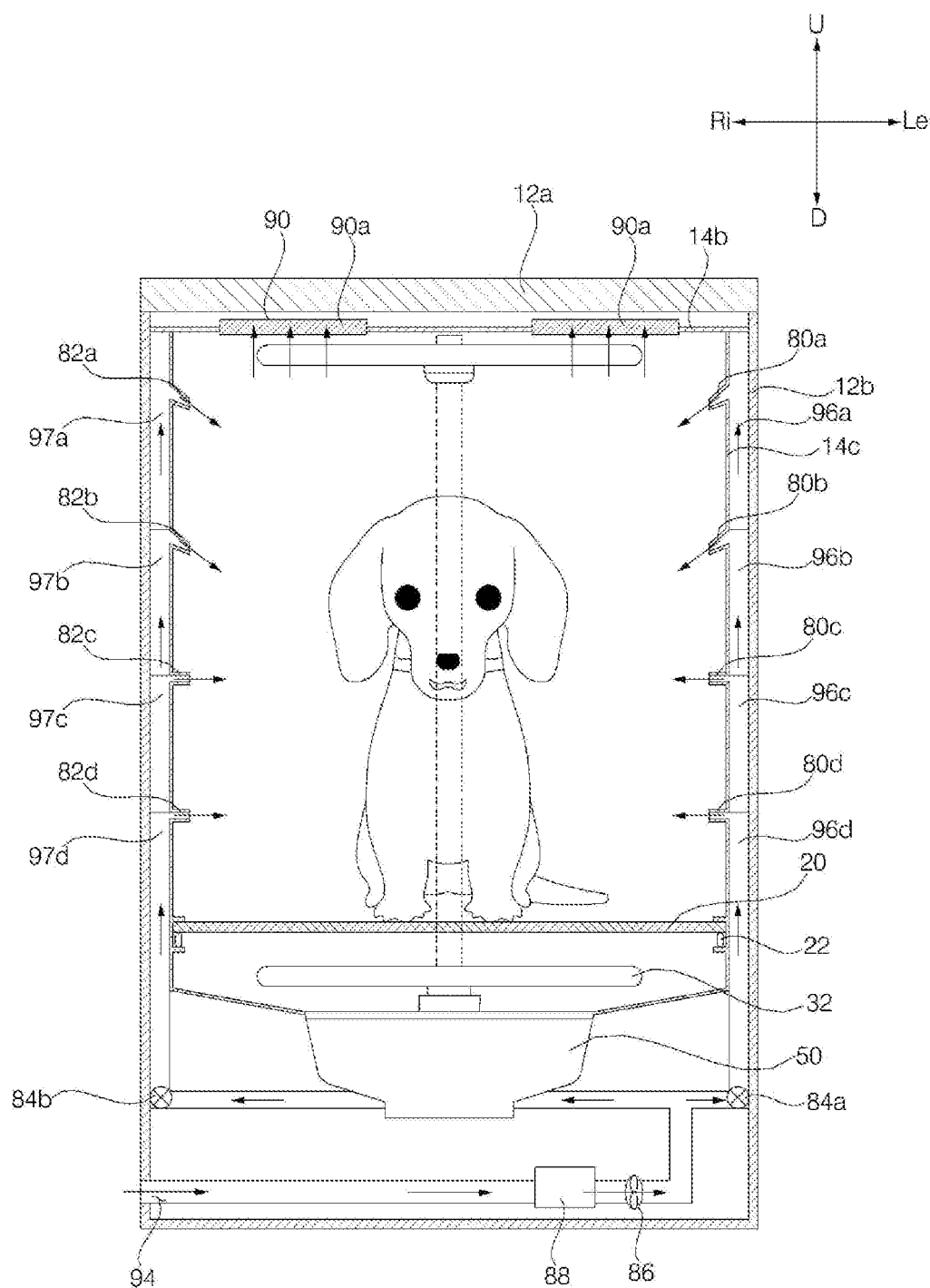
FIG. 8A is a schematic front sectional view of a pet bath in accordance with one embodiment of the present disclosure, illustrating a drying device.
Figure 8B:
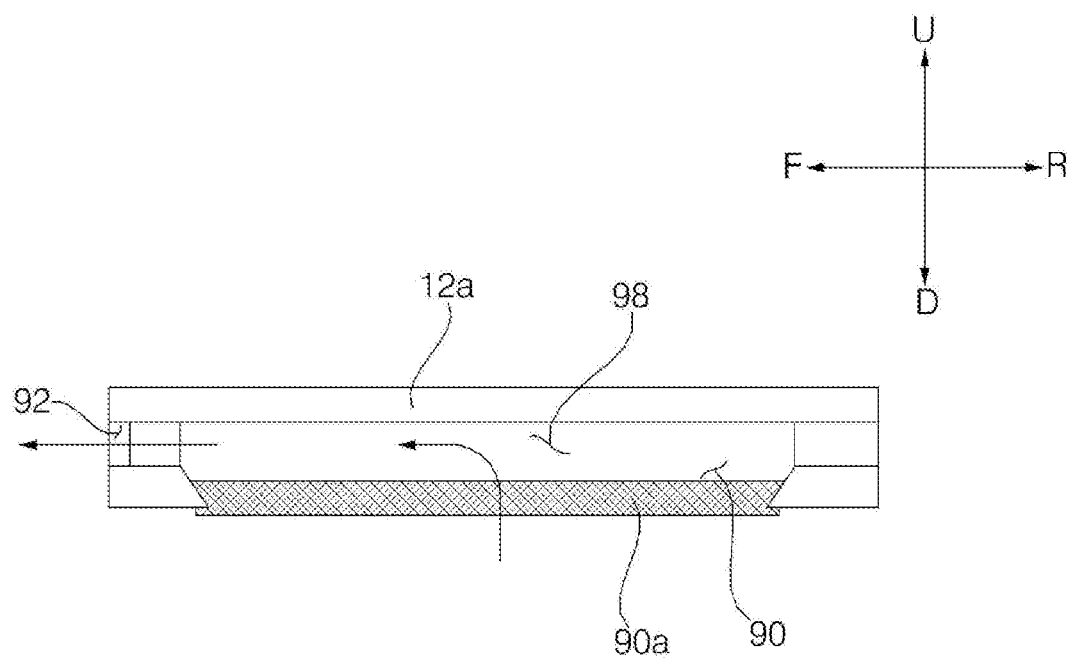
FIG. 8B is a side sectional view of the upper part of the pet bath of FIG. 8A, illustrating an upper flow path of the drying device.

FIG. 8A is a schematic front sectional view of a pet bath in accordance with one embodiment of the present disclosure, illustrating a drying device. FIG. 8B is a side sectional view of the upper part of the pet bath of FIG. 8A, illustrating an upper flow path of the drying device.

Hereinafter, elements related to the drying device of the pet bath in accordance with this embodiment will be described with reference to FIGS. 8A and 8B.

The drying device in accordance with this embodiment includes an air blower 86 which generate air flow to the space of the bathing enclosure 14*a*, air nozzles 80 and 82 which spray air flowing due to operation of the air blower 86 to the inside of the bathing enclosure 14*a*, and an air heater 88 which heats air flowing due to operation of the air blower 86.

The drying device in accordance with this embodiment is an exhaust-type drying device in which air introduced from the outside is heated by the air heater 88 and then sprayed to the bathing enclosure 14*a*, and air flowing in the bathing enclosure 14*a* is discharged to the outside of the casing 10.

Therefore, an outer inflow hole 94 through which external air flows into the casing 10 may be formed at one side of the casing 10, and an outer exhaust hole 92 through which internal air in the bathing enclosure 14*a* is exhausted to the outside of the casing 10 may be formed at the other side of the casing 10.

The air nozzles 80 and 82 which spray air to the bathing enclosure 40*a* are disposed on the side surfaces of the inner cabinet 14 in accordance with this embodiment. The air nozzles 80 and 82 in accordance with this embodiment may be formed in plural on the side surfaces of the inner cabinet 14. Therefore, air flowing due to operation of the air blower 86 may be sprayed to the inside of the bathing enclosure 14*a* by the air nozzles formed at various positions. Thereby, air is sprayed to various regions of a pet located in the space of the bathing enclosure 14*a*, thus being capable of effectively drying the pet.

If air heated by the air heater 88 is continuously applied to a designated region of the pet skin, there is a risk of xeroderma and burning. Therefore, a controller 100 may control a spraying time and/or a spraying sequence of the air nozzles 80 and 82 in a predetermined order, thus preventing hot air from being applied to one region for a designated time or more.

Inner exhaust holes 90 which exhaust air flowing in the bathing enclosure 14*a* may be formed through an upper surface 14*b* of the inner cabinet 14 in accordance with this embodiment. The drying device in accordance with this embodiment includes air filters 90*a* which are disposed in the inner exhaust holes 90 to filter foreign substances from flowing air. The air filters 90*a* may filter out pet fur from the flowing air.

An exhaust flow path 98 which connects the inner exhaust holes 90 to the outer exhaust hole 92 is formed between the upper surface 14*b* of the inner cabinet 14 and an upper surface 12*a* of the outer cabinet 12. The outer exhaust hole 92 in accordance with this embodiment may be formed at the upper end of the front portion of the casing 10, and air exhausted from the bathing enclosure 14*a* may be exhausted frontwards through the outer exhaust hole 92.

Inflow paths 96 and 97 which guide air flowing due to operation of the air blower 86 to the air nozzles 80 and 82 may be formed between side surfaces 14*c* of the inner cabinet 14 and side surfaces 12*b* of the outer cabinet 12.

The air nozzles 80 and 82 in accordance with this embodiment may be disposed in plural on the side surfaces of the bathing enclosure 14*a*, and the inflow paths 96 and 97 may be also formed in plural so as to be respectively connected to the air nozzles 80 and 82.

The air nozzles 80 and 82 in accordance with this embodiment may include a plurality of first air nozzles 80*a*, 80*b*, 80*c* and 80*d* disposed on the left side surface 14*c* of the inner cabinet 14, and a plurality of second air nozzles 82*a*, 82*b*, 82*c* and 82*d* disposed on the right side surface 14*c* of the inner cabinet 14. The inflow paths 96 and 97 in accordance with this embodiment may include a plurality of first inflow paths 96*a*, 96*b*, 96*c* and 96*d* which guide air flowing due to operation of the air blower 86 to the first air nozzles 80*a*, 80*b*, 80*c* and 80*d*, and a plurality of second inflow paths 97*a*, 97*b*, 97*d* and 97*d* which guide air flowing due to operation of the air blower 86 to the second air nozzles 82*a*, 82*b*, 82*c* and 82*d*.

The drying device in accordance with this embodiment may include a first air distributor 84*a* which supplies air flowing due to operation of the air blower 86 to at least one of the first inflow paths 96*a*, 96*b*, 96*c* and 96*d*, and a second air distributor 84*b* which supplies air flowing due to operation of the air blower 86 to at least one of the second inflow paths 97*a*, 97*b*, 97*c* and 97*d*.

The first air distributor 84*a* may adjust the at least one of the first inflow paths 96*a*, 96*b*, 96*c* and 96*d*, which sprays air, or a quantity of air sprayed therefrom. The second air distributor 84*b* may adjust the at least one of the second inflow paths 97*a*, 97*b*, 97*c* and 97*d*, which sprays air, or a quantity of air sprayed therefrom.

The first air nozzles 80*a*, 80*b*, 80*c* and 80*d* are arranged in the vertical direction on the left side surface 14*c* of the inner cabinet 14. Therefore, air sprayed from the left side surface 14*c* of the inner cabinet 14 to the inside of the bathing enclosure 14*a* may be adjusted in the vertical direction by the first air distributor 84*a*. The second air nozzles 82*a*, 82*b*, 82*c* and 82*d* are arranged in the vertical direction on the right side surface 14*c* of the inner cabinet 14. Therefore, air sprayed from the right side surface 14*c* of the inner cabinet 14 to the inside of the bathing enclosure 14*a* may be adjusted in the vertical direction by the second air distributor 84*b*.

The air distributors 84*a* and 84*b* in accordance with this embodiment may adjust flow of air, blown by the air blower 86, to all or some of the inflow paths 96*a*, 96*b*, 96*c*, 96*d*, 97*a*, 97*b*, 97*d* and 97*d*.

<Drying Device—Embodiment 2>

Figure 9A:
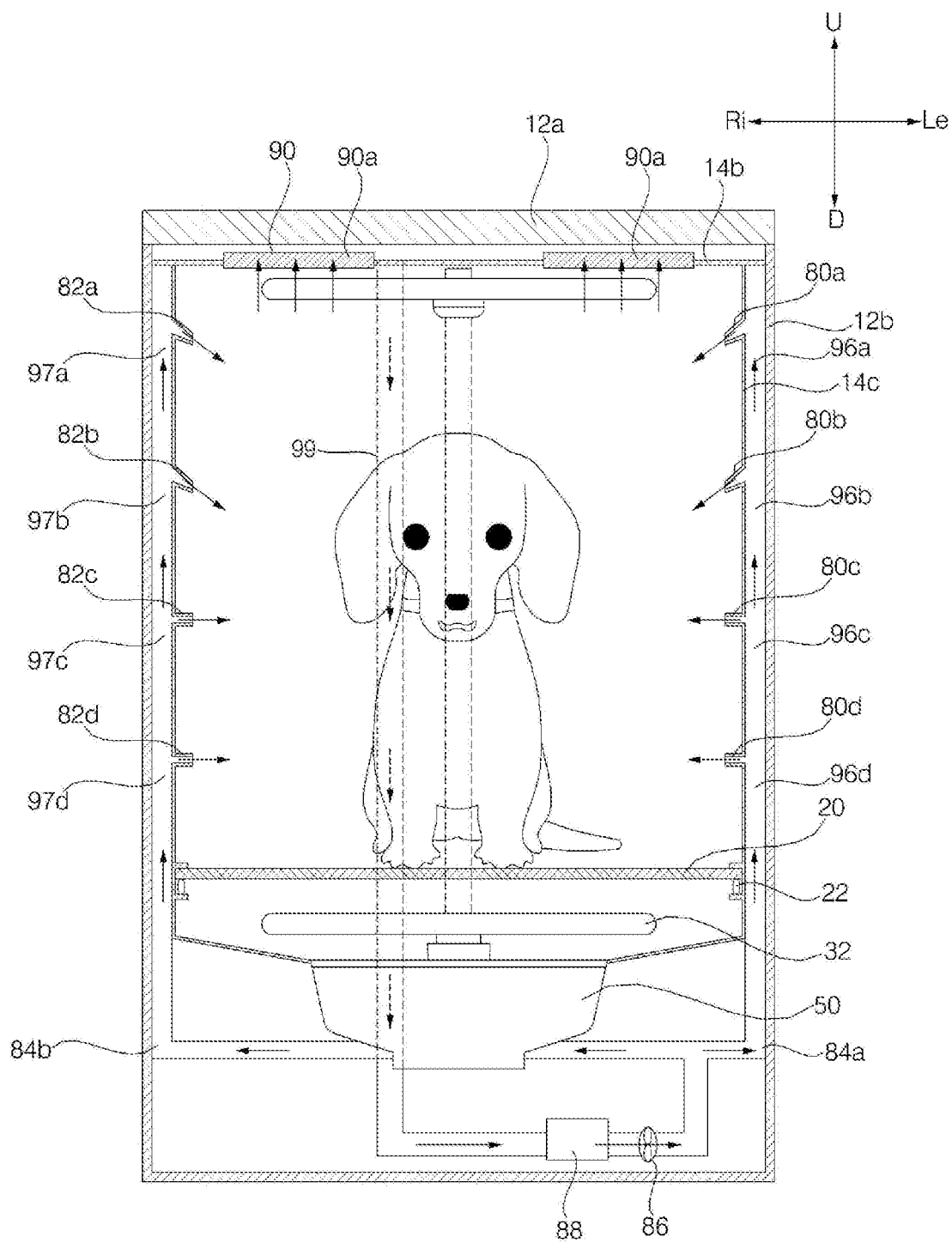
FIG. 9A is a schematic front sectional view of a pet bath in accordance with another embodiment of the present disclosure, illustrating a drying device.
Figure 9B:
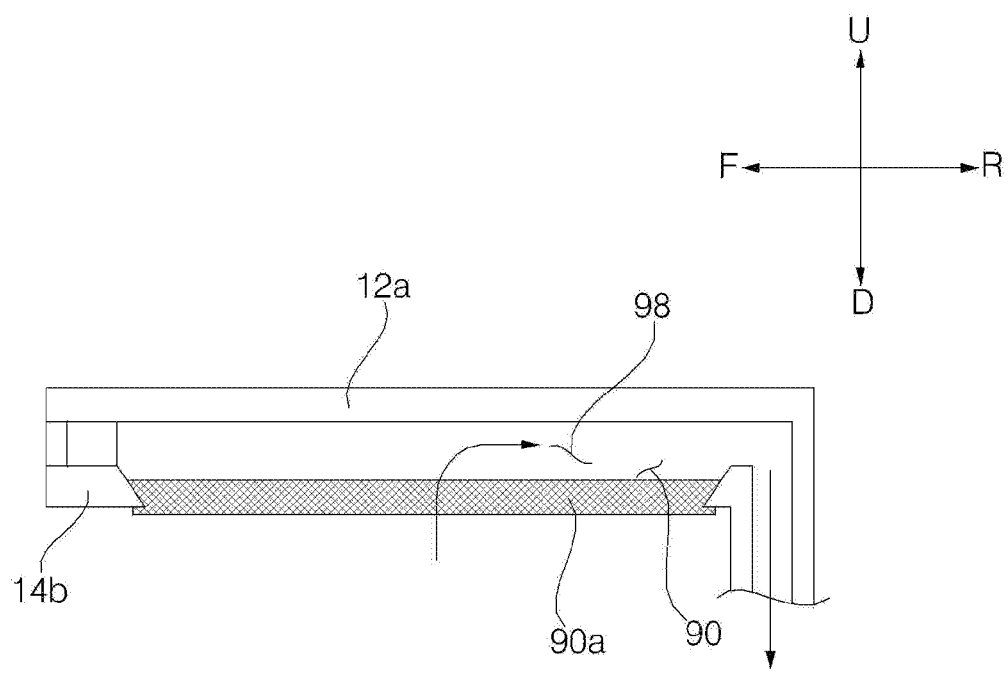
FIG. 9B is a side sectional view of the upper part of the pet bath of FIG. 9A, illustrating an upper flow path of the drying device.

FIG. 9A is a schematic front sectional view of a pet bath in accordance with another embodiment of the present disclosure, illustrating a drying device. FIG. 9B is a side sectional view of the upper part of the pet bath of FIG. 9A, illustrating an upper flow path of the drying device.

Hereinafter, Hereinafter, some elements of the drying device in accordance with this embodiment and dispositions thereof, which differ from those of the drying device in accordance with the former embodiment, will be mainly described with reference to FIGS. 9A and 9B.

The drying device in accordance with this embodiment is a circulation-type drying device in which air blown by an air blower 86 is heated by an air heater 88 and sprayed to a bathing enclosure 14*a*, and air flowing in the bathing enclosure 14*a* is again circulated to the air blower 86.

The circulation-type drying device in accordance with this embodiment is not provided with an outer drain hole and an outer inflow hole connected to a drying flow path. Of course, an air path which communicates with the outside to secure safety of a pet located in the bathing enclosure 14*a* may be separately formed.

An exhaust flow path 98, along which air exhausted from the bathing enclosure 14*a* flows, is formed between an upper surface 14*b* of an inner cabinet 14 and an upper surface 12*a* of an outer cabinet 12, and a circulation flow path 99, along which air flowing along the exhaust flow path 98 flows to a space in which the air blower 86 is disposed, is formed between a rear surface of the inner cabinet 14 and a rear surface of the outer cabinet 12.

Inflow paths 96 and 97 which guide air flowing due to operation of the air blower 86 to air nozzles 80 and 82 are formed between the side surfaces 14*c* of the inner cabinet 14 and the side surfaces 12*b* of the outer cabinet 12. Therefore, air flowing due to operation of the air blower 86 via the air heater 88 may flow to the bathing enclosure 14*a* of the air nozzles 80 and 82, pass through air filters 90*a*, and be circulated to the air heater 88 and the air blower 86 via the exhaust flow path 98 and the circulation flow path 99.

The air heater 88 in accordance with this embodiment may employ a heat pump which performs compression and phase change of a refrigerant and thus exchanges heat with air. In this case, air exhausted from the bathing enclosure 14*a* may exchange heat with an evaporator (not shown) so that moisture in the air may be condensed, and thereafter exchange heat with a condenser (not shown) so that heated high-temperature and low-humidity air may be supplied to the bathing enclosure 14*a*.

<Controller-Related Elements>

Figure 10:
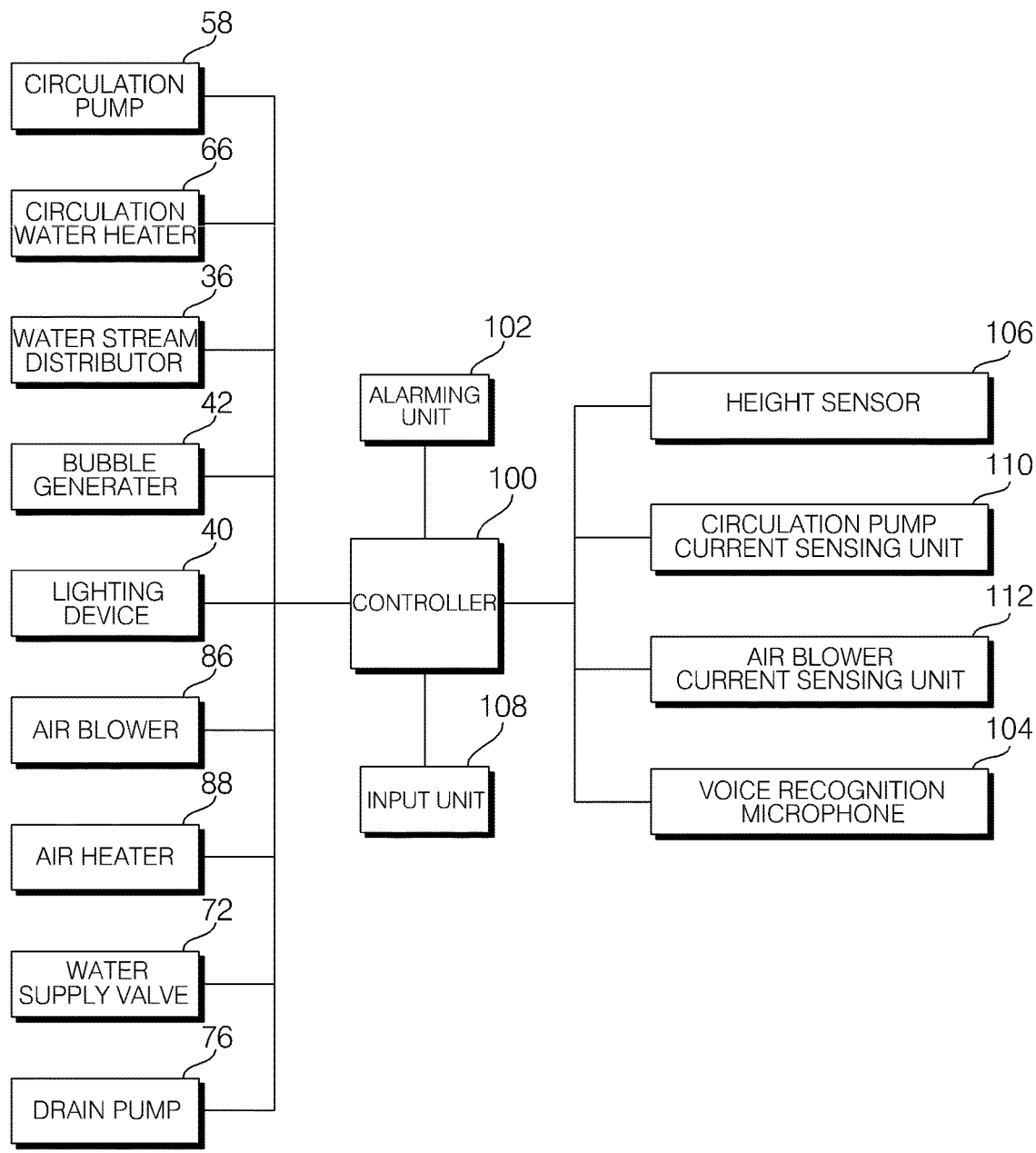
FIG. 10 is a block diagram illustrating elements related to a controller of a pet bath in accordance with one embodiment of the present disclosure.

FIG. 10 is a block diagram illustrating elements related to a controller of the pet bath in accordance with one embodiment of the present disclosure.

Hereinafter, referring to FIG. 10, the controller in accordance with this embodiment and the elements related thereto will be descried.

The pet bath 1 in accordance with this embodiment may further include the controller 100 which controls operation of the washing device or the drying device.

The pet bath 1 in accordance with this embodiment may further include the lighting devices 40 which illuminate the inside of the bathing enclosure 14*a*. The lighting devices 40 may be disposed at upper corners of the bathing enclosure 14*a*. The lighting devices 40 in accordance with this embodiment illuminate the inside of the bathing enclosure 14*a*, and may thus provide comfort to a pet located in the bathing enclosure 14*a*. The lighting devices 40 in accordance with this embodiment may use LED lamps which emit soft light to the inside of the bathing enclosure 14*a*, or infrared lamps which emit far-infrared light to the inside of the bathing enclosure 14*a* to treat skin conditions of the pet.

The pet bath 1 in accordance with this embodiment may further include the height sensor 166 which senses the height of the pet located in the bathing enclosure 14*a*, and a voice recognition microphone 114 which senses sounds made by the pet.

The height sensor 106 in accordance with this embodiment radiates laser light perpendicularly to the bottom surface 14*d* of the bathing enclosure 14*a* and may thus measure the size of the pet located in the bathing enclosure 14*a*, or includes a plurality of proximity sensors disposed at one side surface of the inner cabinet 14 to measure the size of the pet. The height sensor 106 in accordance with this embodiment may confirm whether or not a pet is present within the bathing enclosure 14*a* in addition to the size of the pet.

The pet bath 1 in accordance with this embodiment may further include an alarm unit 102 which informs the user of the state of use of the pet bath 1 or an emergency state.

The pet bath 1 in accordance with this embodiment may further include an input unit 108 through which the user inputs conditions necessary for bathing the pet. The user may directly input a size or weight of the pet, a time necessary for bathing the pet, etc. through the input unit 108.

The controller 100 in accordance with the present disclosure may control operation of the washing device. That is, the controller 100 may control operation of the circulation pump 58 or control operation of the water stream distributor 36 according to the size or degree of contamination of the pet located in the bathing enclosure 14*a*.

The controller 100 in accordance with the present disclosure may control operation of the drying device. That is, the controller 100 may control the RPM of the air blower 86 or control operation of the air heater 88 according to the size of the pet or the amount of fur of the pet located in the bathing enclosure 14*a*.

The controller 100 in accordance with the present disclosure opens and closes the water supply valve 72, or operates the drain pump 76. The controller 100 in accordance with the present disclosure may control the lighting devices 40 so as to provide comfort to the pet located in the bathing enclosure 14*a*.

Further, the pet bath 1 in accordance with the present disclosure may further include a circulation pump current sensing unit 110 which senses an amount of current applied to the circulation motor 64 when the circulation pump 58 is operated, and an air blower current sensing unit 112 which senses an amount of current applied to the air blower 86 when the air blower 86 is operated.

The controller 100 may sense whether or not the circulation water filter 56 is clogged or whether or not the air filters 90*a* are clogged based on the amounts of current sensed by the circulation pump current sensing unit 110 and the air blower current sensing unit 112.

<Operation of Pet Bath>

Figure 11:
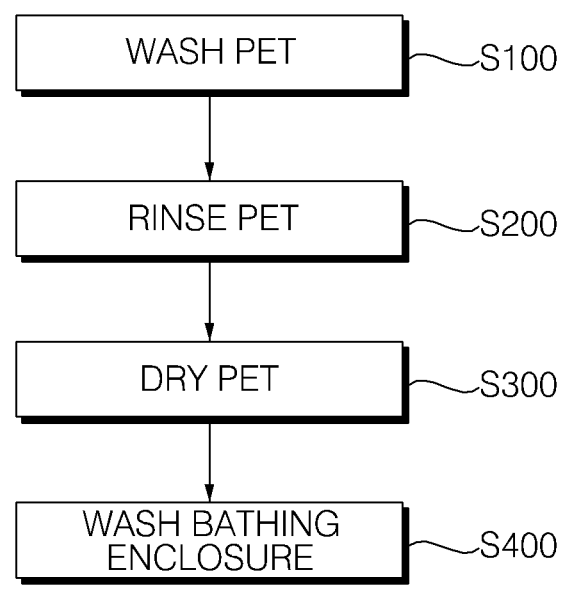
FIG. 11 is a flowchart illustrating a method for controlling a pet bath in accordance with one embodiment of the present disclosure.
Figure 12:
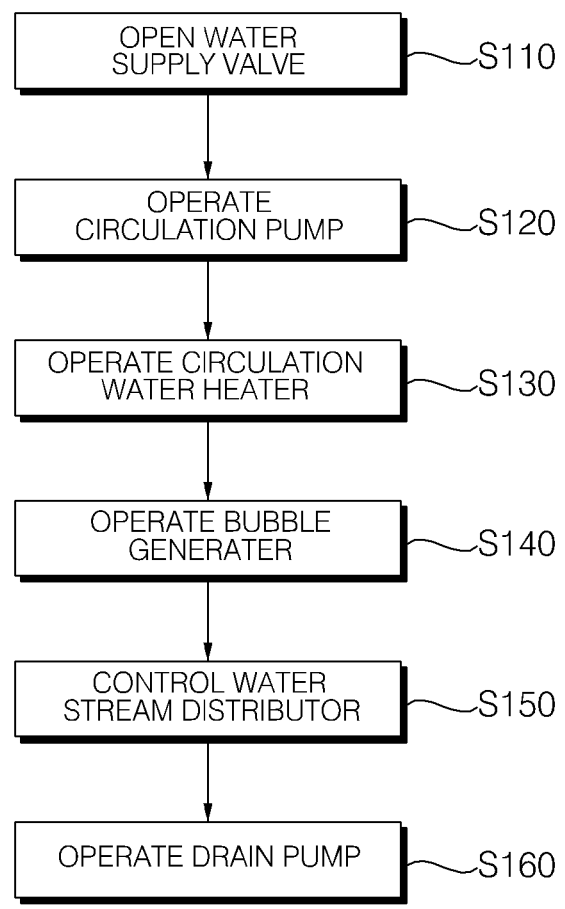
FIG. 12 is a flowchart illustrating a washing operation of FIG. 11.
Figure 13:
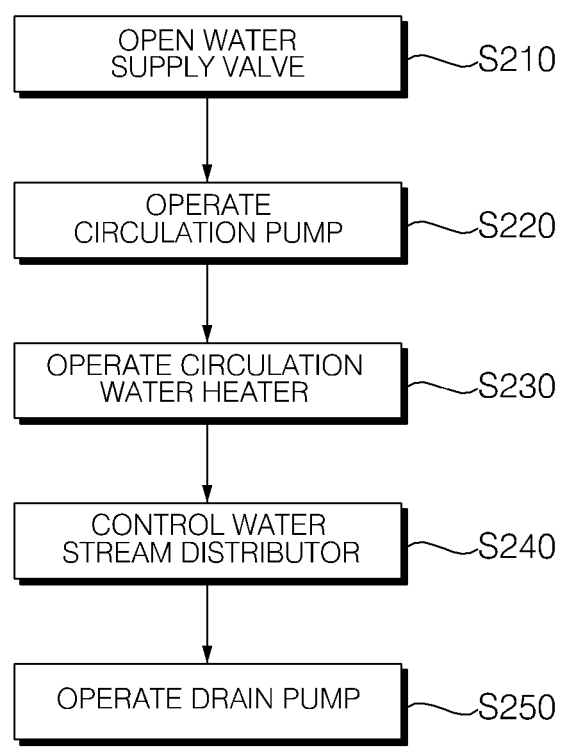
FIG. 13 is a flowchart illustrating a rinsing operation of FIG. 11.
Figure 14:
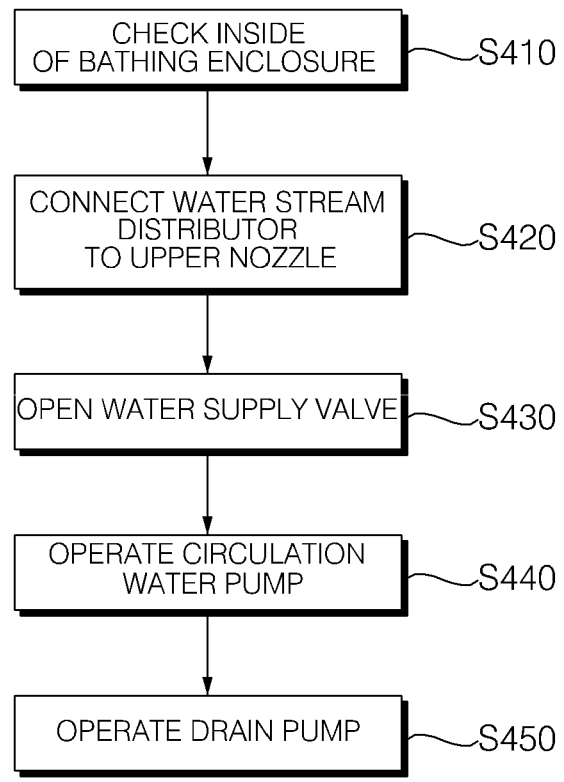
FIG. 14 is a flowchart illustrating a bathing enclosure washing operation of FIG. 11.

FIG. 11 is a flowchart illustrating a method for controlling a pet bath in accordance with one embodiment of the present disclosure. FIG. 12 is a flowchart illustrating a washing operation of FIG. 11. FIG. 13 is a flowchart illustrating a rinsing operation of FIG. 11. FIG. 14 is a flowchart illustrating a bathing enclosure washing operation of FIG. 11.

Hereinafter, a method for controlling a pet bath in accordance with this embodiment will be described with reference to FIGS. 11 to 14.

The method in accordance with this embodiment includes washing a pet located in the bathing enclosure 14*a* using a detergent, such as shampoo (operation S100), rinsing the pet so as to remove the remaining detergent or bubbles from the body of the pet (operation S200), after the washing of the pet (operation S100), and drying the pet so as to remove moisture from the body of the pet (operation S300), after the rinsing of the pet (operation S200).

The method in accordance with this embodiment may further includes washing the bathing enclosure 14*a* within the inner cabinet 14 in a state in which the pet is taken out from the bathing enclosure 14*a* (operation S400), after the drying (operation S300).

In the washing of the pet (operation S100) in accordance with this embodiment, washing water may be supplied to the water collection tank 50 by opening the water supply valve 72 (operation S110). Further, the washing water may be sprayed to the inside of the bathing enclosure 14*a* and the washing water stored in the water collection tank 50 may be circulated by operating the circulation pump 58 (operation S120).

Further, the washing water supplied to the bathing enclosure 14*a* may be heated by operating the circulation water heater 66 (operation 130). Here, the washing water supplied to the bathing enclosure 14*a* may be heated to a temperature which does not frighten the pet. Therefore, the operation of the circulation water heater 66 (operation S130) may be performed prior to the operation of the circulation pump 58.

Thereafter, bubbles may be generated in washing water sprayed to the bathing enclosure 14*a* by operating the bubble generator 42 (operation S140). Therefore, the dispenser 18 may be opened prior to the operating the bubble generator 42 (operation S140), and thus, a pet care agent may be supplied to the inside of the bathing enclosure 14*a*.

Since the pet bath 1 in accordance with this embodiment has a structure in which the washing water stored in the water collection tank 50 is circulated by the circulation pump 58, even if the pet care agent is put into the bathing enclosure 14*a* or the bubble generator 42 is present in the bathing enclosure 14*a*, the pet care agent may be mixed with the circulated washing water, and the washing water having bubbles may be supplied to the inside of the bathing enclosure 14*a* by the spray nozzles.

The controller 100 may control the water steam distributor 36 so as to supply washing water pumped by the circulation pump 58 to the lower nozzle 32 or the upper nozzle 34 (operation S150).

Further, if a plurality of upper nozzles 34*a*1", 34*a*2", 34*a*3", 34*a*4", 34*b*1", 34*b*2", 34*b*3" and 34*b*4" is provided, as shown in FIG. 6, the controller may control a plurality of nozzle valves 35*a*1, 35*a*2, 35*a*3, 35*a*4, 35*b*1, 35*b*2, 35*b*3 and 35*b*4 so as to adjust washing water respectively supplied to the upper nozzles 34*a*1", 34*a*2", 34*a*3", 34*a*4", 34*b*1", 34*b*2", 34*b*3" and 34*b*4".

Thereafter, washing water in the water collection tank 50 may be drained by operating the drain pump 76 (operation S160).

All of the respective processes of the washing operation may be repeatedly executed, and such repeated execution may be varied according to the bathing method of the pet.

In the rinsing of the pet (operation S200) in accordance with this embodiment, washing water may be supplied to the water collection tank 50 by opening the water supply valve 72 (operation S210). Thereafter, heated washing water may be supplied to the bathing enclosure 14*a* by operating the circulation pump 58 (operation S220) and operating the circulation water heater 66 (operation S230).

The controller 100 may control the water steam distributor 36 so as to supply washing water pumped by the circulation pump 58 to the lower nozzle 32 or the upper nozzle 34 (operation S240). In the rinsing of the pet (operation S200), remaining bubbles are removed from the body of the pet, and thus, a rate at which washing water is supplied to the upper nozzle 34 (a supply time or a supply amount of washing water to the upper nozzle 34) may be increased compared to when the washing (operation S100).

Thereafter, the washing water in the water collection tank 50 may be drained by operating the drain pump 76 (operation S250).

The drying of the pet (operation S300) may be performed after the washing water stored in the water collection tank 50 is drained by operating the drain pump 76. The drying of the pet (operation S300) in accordance with this embodiment may be performed by spraying warm air to the inside of the bathing enclosure 14*a* by operating the air blower 86 and the air heater 88.

In the washing of the bathing enclosure 14*a* (operation S400) in accordance with this embodiment, the inside of the bathing enclosure 14*a* is checked (operation S410). Since the washing of the bathing enclosure 14*a* (operation S400) in accordance with this embodiment is performed in a state in which no pet is present in the bathing enclosure 14*a*, the checking of the inside of the bathing enclosure 14a (operation S410) is primarily performed.

In the checking of the inside of the bathing enclosure 14a (operation S410), whether or not a pet is present in the bathing enclosure 14a may be confirmed. The controller 100 may confirm whether or not a pet is present in the bathing enclosure 14a using the height sensor 106.

Thereafter, the water stream distributor 36 is connected to the upper nozzle (operation S420). Since the washing of the bathing enclosure 14a (operation S400) is performed so as to remove foreign substances from the side surfaces, etc. of the bathing enclosure 14a, the foreign substances may be collected in the circulation water filter 56 of the water collection tank 50 by water sprayed downwards from the upper nozzle 34.

Thereafter, washing water may be stored in the water collection tank 50 by opening the water supply valve 72 (operation S430), and the inside of the bathing enclosure 14a may be washed by operating the circulation pump 58 (operation S440). In the washing of the bathing enclosure 14a (operation S400), the circulation motor 64 of the circulation pump 58 may be rotated at a higher RPM than in the washing of the pet (operation S100) or the rinsing of the pet (operation S200). Further, the circulation water heater 66 may also be operated, and in this case, washing water may be heated to a higher temperature than in the washing of the pet (operation S100) or the rinsing of the pet (operation S200).

Thereafter, the washing water in the water collection tank 50 may be drained by operating the drain pump 76 (operation S450).

As apparent from the above description, a pet bath in accordance with the present disclosure has one or more of the following effects.

First, a water collection tank, a lower nozzle and an upper nozzle configured to wash a pet are disposed and an air blower and air nozzles configured to dry the pet are disposed in one pet bath, and thus, the pet may be totally cared for in one space.

Second, since washing water used to wash the pet is stored in a water collection tank, supplied to the bathing enclosure by a circulation pump and supplied again to the water collection tank via a circulation water filter, a designated amount of washing water is circulated, and thus, a water consumption amount used to wash the pet may be reduced.

Third, since a spray pattern of a plurality of spray nozzles is controlled or a spray pattern of a plurality of air nozzles is controlled, spray of heated washing water or heated air to a designated region of the inside of the bathing enclosure may be prevented, and thus, the pet may be safely bathed.

Fourth, washing of the inside of the bathing enclosure is performed after washing, rinsing and drying of the pet, and thus, the inside of the bathing enclosure may be kept clean and the pet bath may be used for a long period of time.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:
1. A pet bath comprising:
   an outer cabinet that forms an external appearance of the pet bath, the outer cabinet having an open front surface;
   an inner cabinet provided within the outer cabinet defining a bathing enclosure therein, the inner cabinet having an open front surface;
   a door configured to open and close the open front surfaces of the outer cabinet and the inner cabinet;
   a water collection tank disposed under the inner cabinet and defining a space in which washing water is stored;
   a circulation pump configured to pump the washing water stored in the water collection tank;
   a lower nozzle disposed at a lower portion of the bathing enclosure and configured to spray the washing water pumped by the circulation pump to the bathing enclosure;
   an upper nozzle disposed above the lower nozzle and configured to spray the washing water pumped by the circulation pump to the bathing enclosure;
   a stand disposed between the lower nozzle and the upper nozzle and configured to support a pet thereon, the stand being configured to drain washing water therethrough;
   a circulation water filter configured to filter washing water flowing from the bathing enclosure to the water collection tank;
   an air blower disposed below the inner cabinet and configured to circulate air in the bathing enclosure; and
   an air nozzle disposed on side surfaces of the inner cabinet and configured to discharge air from the air blower to an inside of the bathing enclosure,
   wherein an inner exhaust hole configured to exhaust air flowing in the bathing enclosure are defined in an upper surface of the inner cabinet,
   wherein the circulation water filter has a cylindrical shape and defines a hollow portion therethrough in a vertical direction, the circulation water filter further comprising a filter net that is disposed on a circumferential surface of the circulation water filter,
   wherein a filter mounting part that is shaped to surround an outer surface of the circulation water filter is provided within the water collection tank such that the circulation water filter is mounted in the filter mounting part, and
   wherein a plurality of through holes configured to allow washing water flowing in the circulation water filter to flow into the water collection tank are defined through the filter mounting part.

2. The pet bath according to claim 1, wherein the lower nozzle is disposed between a bottom surface of the inner cabinet and the stand, and is configured to spray the washing water pumped by the circulation pump in an upward direction relative to the stand.

3. The pet bath according to claim 1, wherein the upper nozzle is disposed in an upper portion of the bathing enclosure, and is configured to spray the washing water pumped by the circulation pump in a downward direction.

4. The pet bath according to claim 1, wherein the air nozzle comprises a plurality of first air nozzles arranged in the vertical direction on one side surface of the inner cabinet, and a plurality of second air nozzles arranged in the vertical direction on another side surface of the inner cabinet.

5. The pet bath according to claim 4, further comprising:
   a plurality of first inflow paths configured to respectively guide the air flowing due to operation of the air blower to the first air nozzles;
   a plurality of second inflow paths configured to respectively guide the air flowing due to operation of the air blower to the second air nozzles;

a first air distributor configured to supply the air flowing due to operation of the air blower to at least one of the first inflow paths; and a second air distributor configured to supply the air flowing due to operation of the air blower to at least one of the second inflow paths.

6. The pet bath according to claim 1, wherein an outer inflow hole configured to allow external air to flow into the bathing enclosure and an outer exhaust hole configured to exhaust air flowing through the inner exhaust hole to the outside are defined in the outer cabinet or in a space between the inner cabinet and the outer cabinet.

7. The pet bath according to claim 1, wherein an inflow path configured to guide air flowing due to operation of the air blower to the air nozzle, an exhaust flow path along which air exhausted from the bathing enclosure via the inner exhaust hole flows, and a circulation flow path along which air flowing along the exhaust flow path flows to a space, in which the air blower is disposed, are disposed between the inner cabinet and the outer cabinet.

8. The pet bath according to claim 7, further comprising an air heater configured to heat air flowing through the air blower, the air heater comprising a heat pump that comprises a compressor configured to compress a refrigerant, a condenser configured to condense the compressed refrigerant, an expander configured to expand the condensed refrigerant, and an evaporator configured to evaporate the expanded refrigerant, and wherein air flowing into the circulation flow path sequentially passes through the evaporator and the condenser, and is supplied to the circulation flow path.

9. The pet bath according to claim 1, further comprising a bubble generator disposed between the stand and a bottom surface of the inner cabinet, the bubble generator being configured to generate bubbles in flowing washing water.

10. A method for controlling a pet bath, wherein the pet bath includes an outer cabinet that forms an external appearance of the pet bath, the outer cabinet having an open front surface, an inner cabinet provided within the outer cabinet defining a bathing enclosure therein, the inner cabinet having an open front surface, a door configured to open and close the open front surfaces of the outer cabinet and the inner cabinet, a water collection tank disposed under the inner cabinet and defining a space in which washing water is stored, a circulation pump configured to pump the washing water stored in the water collection tank, a lower nozzle disposed at a lower portion of the bathing enclosure and configured to spray the washing water pumped by the circulation pump to the bathing enclosure, and an upper nozzle disposed above the lower nozzle and configured to spray the washing water pumped by the circulation pump to the bathing enclosure, the method comprising:

washing a pet located in the bathing enclosure using a detergent;

based on washing the pet, rinsing the pet to thereby remove the detergent from a body of the pet;

based on rinsing the pet, drying the pet to thereby remove moisture from the body of the pet; and based on drying the pet and the pet being removed from the bathing enclosure, washing the bathing enclosure, wherein washing the bathing enclosure comprises:

checking the inside of the bathing enclosure to determine whether the pet has been removed, connecting a water stream distributor, configured to supply washing water pumped by the circulation pump to at least one of the upper nozzle or the lower nozzle, to the upper nozzle, operating the circulation pump, and operating a drain pump.

11. The method according to claim 10, wherein, in the checking the inside of the bathing enclosure includes receiving information from a height sensor disposed in the bathing enclosure.

12. The method according to claim 10, wherein the washing the pet comprises:

supplying washing water to the water collection tank by opening a water supply valve;

supplying washing water stored in the water collection tank into the bathing enclosure by operating the circulation pump;

generating bubbles in flowing washing water by operating a bubble generator;

connecting the water stream distributor to at least one of the upper nozzle or the lower nozzle; and draining the washing water stored in the water collection tank by operating the drain pump.

13. A pet bath comprising:

an outer cabinet that forms an external appearance of the pet bath, the outer cabinet having an open front surface;

an inner cabinet provided within the outer cabinet defining a bathing enclosure therein, the inner cabinet having an open front surface;

a door configured to open and close the open front surfaces of the outer cabinet and the inner cabinet;

a water collection tank disposed under the inner cabinet and defining a space in which washing water is stored;

a circulation pump configured to pump the washing water stored in the water collection tank;

a lower nozzle disposed at a lower portion of the bathing enclosure and configured to spray the washing water pumped by the circulation pump to the bathing enclosure;

an upper nozzle disposed above the lower nozzle and configured to spray the washing water pumped by the circulation pump to the bathing enclosure;

a stand disposed between the lower nozzle and the upper nozzle and configured to support a pet thereon, the stand being configured to drain washing water therethrough;

a circulation water filter configured to filter washing water flowing from the bathing enclosure to the water collection tank;

an air blower disposed below the inner cabinet and configured to circulate air in the bathing enclosure; and an air nozzle disposed on side surfaces of the inner cabinet and configured to discharge air from the air blower to an inside of the bathing enclosure, wherein an inner exhaust hole configured to exhaust air flowing in the bathing enclosure are defined in an upper surface of the inner cabinet, wherein the air nozzle comprises a plurality of first air nozzles arranged in a vertical direction on one side surface of the inner cabinet, and a plurality of second air nozzles arranged in the vertical direction on another side surface of the inner cabinet, and wherein the pet bath further comprises:

a plurality of first inflow paths configured to respectively guide the air flowing due to operation of the air blower to the first air nozzles, a plurality of second inflow paths configured to respectively guide the air flowing due to operation of the air blower to the second air nozzles, a first air distributor configured to supply the air flowing due to operation of the air blower to at least one of the first inflow paths, and
a second air distributor configured to supply the air flowing due to operation of the air blower to at least one of the second inflow paths.

\* \* \* \* \*